Patented Feb. 22, 1938

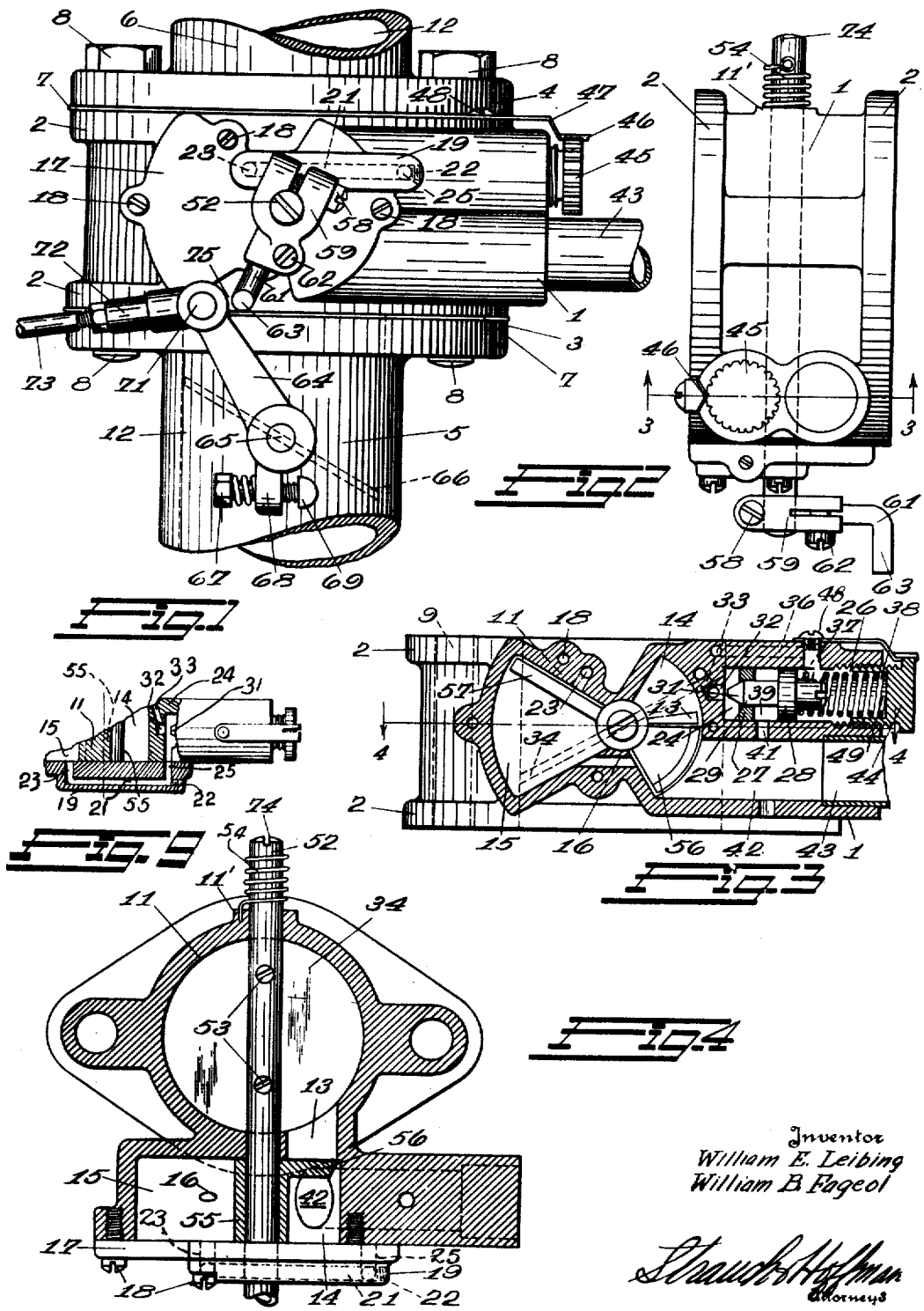

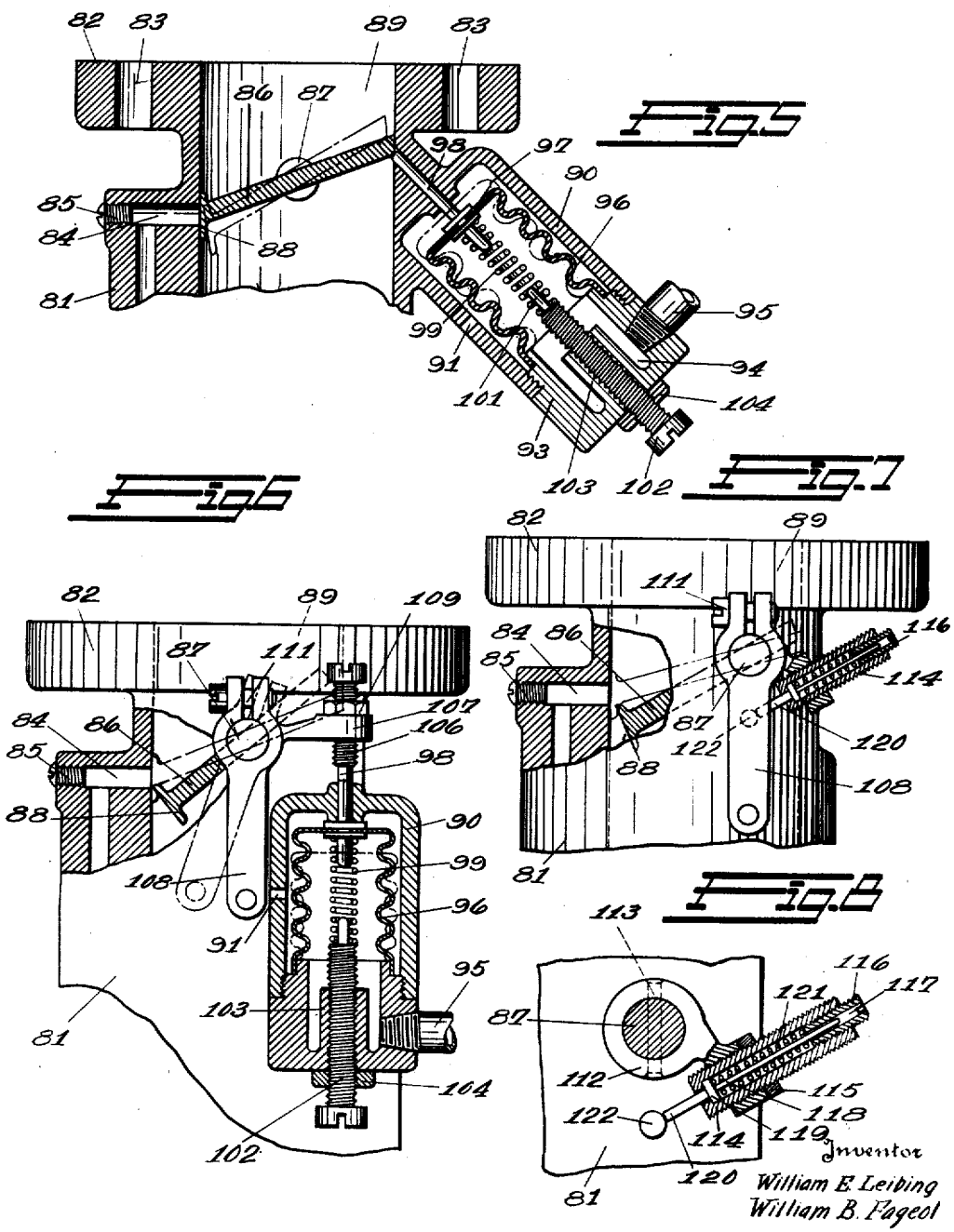

2,109,296

UNITED STATES PATENT OFFICE 2,109,296

FUEL CONTROL APPARATUS

William E. Leibing, Sausalito, Calif., and William B. Fageol, Kent, Ohio

Application October 14, 1931, Serial No. 568,844

9 Claims. (Cl. 123—97)

The present invention relates to methods and apparatus for controlling the fuel supply for internal combustion engines.

More particularly the invention relates to methods of controlling the fuel supply for internal combustion engines utilized to propel motor vehicles such as automobiles, busses, rail cars, aeroplanes, motor boats and the like.

It has been found by extensive experiments with ordinary operation of motor vehicles that with proper adjustment, during normal idling, acceleration, and periods when the engine is driving the vehicle, effective combustion of fuel is attained and no substantial objectionable discharge of unburned or partly burned fuel occurs. On the other hand, during deceleration periods with the throttle of the engine closed, and the engine turning over at high speed, heavy discharges of unburned and partially burned fuel occur in the form of gases and smoke which are very objectionable and injurious to public health and comfort.

Highest grades of motor fuel taken into the cylinders of internal combustion engines operating at speeds substantially above idling speeds with the throttle closed, are discharged in unburned or partially burned condition as noxious, objectionable and dangerous gases and smoke, apparently due to the lack of proper compression and ignition, while when a motor is idling and accelerating the fuel is consumed sufficiently so that the exhaust gases even from low grade fuels are more or less unobjectionable.

Investigations have shown conclusively that the major portion of gassing and smoking in motor vehicle operation is due to the discharge of unburned and partially burned fuel during deceleration. At the higher motor speeds with the throttle closed, unburned fuel is exhausted, giving off disagreeable odors and fouling the cylinders, exhaust line and muffler. As the motor resumes ignition the hot burned and burning gases mix with the gases in the exhaust line and muffler forming dangerous carbon monoxide gases, and objectionable smoke until the unburned gases are cleared out by efficient combustion of fuel during idling and accelerating operations.

In ordinary operation of automobiles and automotive vehicles during a large percentage of operation the engines are driven with closed throttles by the vehicle momentum at speeds considerably above the speeds at which effective ignition and combustion of fuel fed to the engine can occur. This condition occurs with particular frequency in heavy traffic, and on hills. Bus drivers making frequent stops, speed up their vehicles after each stop to keep up schedules, and when barely up to speed, must decelerate by closing the engine throttle and using the engine as a brake in heavy traffic. Motor vehicle operators in congested areas speed their vehicles for short clear distances frequently in reduced gear, and decelerate by closing the throttle and using the engine as a brake as crossings, signals, and congested traffic are approached. In descending hills and in stopping motor vehicles, it is also general practice to close the throttle and to utilize the engine for deceleration in well known manner.

With such operation, during a large percentage of time, the engine is decelerating the vehicle, pouring noxious, dangerous gases, smoke, and unburned and partially burned fuel into the atmosphere, creating a general nuisance injurious to public health. In addition the fuel supplied to the engine during decelerating periods performs no useful work and is wholly lost. To reduce this smoke and gas nuisance incident to automotive operation to a point permitting practical operation, high grade volatile fuels must be burned in existing automotive engines, since heavier fuels create so much visible noxious smoke and gas that their use violates public health laws.

It has been found possible to eliminate the evil of gassing and to prevent wastes of fuel during deceleration of automotive road vehicles by cutting off the supply of fuel to the engine during deceleration, thereby effecting marked improvements in efficiency and economy of operation of all types of motor vehicles. These highly desirable results are accomplished in simple manner by controlling the fuel supply through utilization of the intake manifold vacuum of internal combustion engines in excess of the normal effective idling intake vacuum. With a mechanism of proper sensitiveness and adapted for ready attachment to existing carburetors, it is possible to control the fuel supply of a properly adjusted internal combustion engine in such manner as to substantially completely eliminate gassing and smoking in operation, and to materially increase the efficiency of the engine, while permitting the effective use of heavier grades of fuel and higher engine compressions, and reducing carbonization and heating of the engines substantially in operation.

In copending applications Serial No. 483,883, filed September 23, 1930, and Serial No. 524,148, filed March 20th, 1931, these desirable results are accomplished effectively by cutting off the fuel supply to the engine when the engine vacuum exceeds its normal idling vacuum while allowing air to enter the engine past the throttle open at least to idling position. In the present invention these desirable results are accomplished by closing the engine intake passage so that the flow of air through the carburetor is reduced sufficiently below idling flow to prevent fuel passing into the engine when and so long as the engine vacuum is above the idling vacuum, by use of a device that can be installed on conventional engines without tapping into the carburetor or manifold connections as is necessary in the devices of said copending applications.

Accordingly a primary object of the present invention is to provide novel methods and apparatus for controlling the fuel supply to internal combustion engines by throttling the engine intake in a manner that will substantially eliminate the exhaust of unburned or partially burned noxious gases.

Another object of the invention is to provide methods and apparatus for supplying fuel to internal combustion engines only when the fuel will be utilized thereby to do useful work by suitably throttling the intake of the engine, thereby minimizing fuel consumption and production of noxious harmful gases, and materially increasing the efficiency of operation.

A further object of the invention is to provide improved means for cutting off the fuel supply to an internal combustion engine when the engine ceases to do useful work and to re-establish the fuel supply without appreciable lag when the engine is called upon to do work by a throttling control which may be attached to existing carburetors economically and at low cost, without the necessity for tapping into or mechanically altering the carburetor or intake manifold.

In the devices of said copending applications, it has been found in practice that under certain operating conditions, as for example, when running at high speed with its throttle open slightly from idling position, a sufficient vacuum may be developed in the intake manifold to cause partial closing of the fuel valve with a resultant lean fuel mixture fed to the engine which causes undesirable sputtering and coughing of the engine. Accordingly, a further object of the present invention is the provision of fuel economizers and fume eliminators for internal combustion engines in which a proper fuel supply is assured for the engine whenever the throttle is opened from idling position.

Other objects of the invention are such as will appear from the following detailed description of the preferred embodiment thereof and are defined in the terms of the appended claims.

Referring to the drawings:

Figure 1 is a side elevation of a preferred embodiment of the present invention, illustrating the method of installation in a motor vehicle of a conventional type.

Figure 2 is an end view of the form of invention illustrated in Figure 1.

Figure 3 is a sectional view taken along lines III—III of Figure 2, looking in the direction of the arrows.

Figure 4 is a sectional view taken along lines IV—IV of Figure 3.

Figure 5 is a fragmental sectional view illustrating a modified form of invention.

Figure 6 is a fragmental view partially in section illustrating a further modification.

Figure 7 is a fragmental view partially in section illustrating still another modification of the invention.

Figure 8 is a detail view partly in section illustrating the stop assembly used in the form of invention shown in Figure 7.

Figure 9 is a detail view in partial section showing the relation of certain of the passages of the form of the invention shown in Figures 1 to 4.

Referring to Figures 1 to 4, inclusive, reference numeral 1 indicates the main housing of the preferred form of device provided with end flanges 2 shaped to conform respectively to flanges 3 and 4 of a conventional carburetor outlet flange 5 and an intake manifold flange 6 for a conventional internal combustion engine. Suitable gaskets 7 are interposed between flanges 2, 3 and 4, and the device is clamped in the position illustrated in Figure 1 by means of the securing bolts or machine screws 8 which pass through the usual holes formed in flange 4 and holes 9 formed in housing 1 in alignment therewith, and the lower ends of which are threaded into suitably tapped holes in flange 3.

It will accordingly be seen that the device may readily be installed on any conventional type of motor vehicle as an attachment without the necessity of tapping into the manifold or carburetor structure.

Housing 1 is provided with a bore 11 of the same diameter as the carburetor outlet and intake manifold bores 12, in alignment with bores 12 when the housing is clamped in position as illustrated in Figure 1. A segmental passage 13 (Figures 3 and 4) formed in housing 1 establishes communication between bore 11 and segmental shaped chamber 14 formed in housing 1. Chamber 14 communicates with segmental chamber 15 formed in housing 1 through passage 16. Cover plate 17 secured in position by means of cap screws 18 closes the ends of segmental chambers 14 and 15.

Cover plate 17 is provided with a rib 19 in which cross passage 21 is built. One end of passage 21 is closed by screw plug 22 and the opposite end thereof communicates through passage 23 with the upper part of segmental chamber 15 (Figures 1, 3 and 4).

Communication is established between passage 21 and chamber 24 (Figure 3) through passage 25 (Figures 1, 4 and 9). Chamber 24 is formed at the inner end of cylindrical bore 26 and the outer wall thereof is provided by pressing washer 27 with an annular central guide opening into bore 26.

Piston 28 mounted for reciprocation in bore 26 is provided with an extension or stem 29 on the end of which conical valve section 31 is formed. Stem 29 passes through and is guided by the central opening in washer 27. With piston 28 and stem 29 in the extreme left position in Figure 3, valve member 31 seats in and seals the end of reduced annular bore or chamber 32 interrupting communication between chambers 24 and 32. Passage 33 leading from chamber 32 establishes communication with bore 11 in housing 1 above the throttling butterfly valve 34.

Communication from bore 11 on the engine side of throttle valve 34 is established through passages 36 and 37 in housing 1 to chamber 38 formed on the right side of piston 28 in bore 26. Communication to atmospheric pressure is established for chamber 39 on the left side of piston 28 in bore 26 through passage 41 which terminates in enlarged bore 42 (Figure 3) formed in housing 1.

Bore 42 communicates at its inner end with the lower end of segmental chamber 14, and is connected by means of the pipe 43 to atmosphere through a suitable air cleaner to prevent dirt from being drawn into the device in operation, as for example to the usual air cleaner of the motor vehicle upon which the device is installed.

The outer end of bore 26 is adjustably capped by plug member 44 provided with a shank on which a fine thread is formed and which is screwed into the tapped end of bore 26. Member 44 is provided with locking notches 45, (Figures 1 and 2) adapted for engagement with V-shaped locking member 46 carried on and yieldably urged into engagement with the notches 45 by means of a flat spring 47. Spring 47 is secured to housing 1 by means of a screw 48, which threads into and closes the extreme outer end of passage 37 in housing 1. Nested in a recess formed in member 44 is the outer end of a compression spring 49, the opposite end of which abuts against piston 28 which urges piston 28 and valve member 31 to the left in Figure 3.

Valve 34 is shaped to assume an angle of approximately 30° to a horizontal plane when in closed position, and is centrally mounted for rotation in a split section of shaft 52. As illustrated in Figure 4, valve 34 is secured in position on the shaft 52 by means of screws 53. Shaft 52 extends centrally across bore 11 and is journalled adjacent one end in a bore formed through the cylindrical wall and a suitable boss of housing 1 (Figure 4). A spiral spring 54 secured at its outer end to shaft 52, and at its inner end to boss 11' surrounds shaft 52 and is tensioned sufficiently to normally urge valve 34 to wide open position where the rotation of shaft 52 is stopped as will more fully hereinafter appear. Shaft 52 is journalled in and extends through a suitable bore formed in housing 1 between the main bore 11 and chambers 14 and 15, and is journalled in and extends through a bearing formed in cover plate 17.

Rigidly secured to and rotatable with shaft 52 in chamber 14 is a sleeve 55 with which segmental valve member 56 adapted to open and close the outer end of passage 13 is integrally formed. In addition to controlling the end of port or passage 13 member 56 is so proportioned that the upper edge thereof engages the wall of chamber 14 to stop valve 34 in a vertical position in bore 11 when the valve is free to move under influence of spring 54 as will hereinafter more fully appear.

Located opposite valve segment 56 in chamber 14 and formed integrally with sleeve 55 is an operating vane 57. Vane 57 extends entirely across and fits loosely in segmental chamber 15.

Secured to the end of shaft 52 projecting beyond cover plate 17 by means of clamping screw 58 (Figures 1 and 2) is operating member 59, in which operating stem 61 is adjustably secured by means of screw 62. Stem 61 is provided with a section 63 extending at right angles sufficiently to be engaged by the upper end of the conventional throttle operating arm 64 of the carburetor on which the device is installed.

Arm 64 in well known manner is secured to operating shaft 65 of a conventional butterfly throttle valve of any well known type of carburetor. The idling position of throttle 66 is adjusted by means of stop screw 67 in well known manner, carried by an extension 68 of arm 64. The end of screw 67 is adapted to engage the well known idling stop 69 of the carburetor body. The upper end of arm 64 is connected by means of a pin 71 to bifurcated end 72 of the throttle operating rod 73 controlled by the foot accelerating mechanism of a motor vehicle (not shown).

In installing the improved device so far described on a motor vehicle: With valve 34 in open position throttle 66 is adjusted to permit proper idling of the engine. The shaft 52 is then turned by means of screw driver slot 74 against the tension of spring 54 to the fully closed position shown in Figure 3. Member 59 and stem 61 are then adjusted until the operating extension 63 contacts as high up on arm 64 as is practical, leaving a clearance between extension 63 and the nearest point of arm 64 of approximately 1/100 of an inch at 75 when arm 64 is in idling position and valve 34 is closed.

With this adjustment of parts, when arm 64 is moved to shift throttle valve 66 from idling position, extension 63 will be engaged to positively open the valve 34 a sufficient amount to permit a proper fuel supply for throttle opening to pass into the engine, thereby assuring an immediate and proper fuel supply mixture for the engine under all conditions of throttle opening. It will also be seen that control valve 34 cannot close so long as carburetor throttle valve 66 is displaced from idling position.

To adjust the device so that it will function properly in operation, after installation, adjusting plug 44, is screwed inwardly a considerable distance compressing spring 49 sufficiently so that valve member 31 will be firmly seated in position closing chamber 32. Atmospheric pressure will then be admitted through the pipe or connection 43, bore 42, chamber 14, passage 16, and chamber 15. The pressure on opposite sides of vane 57 in chamber 15 will equalize due to slight leakage of atmospheric air from its lower to its upper side, and spring 54 will rotate throttling valve 34 to wide open vertical position and will position valve segment 56 to close the outer end of port or passage 13.

With the parts in this position, screw 67 on the carburetor is adjusted so that the engine will idle at the desired speed. Adjusting member or screw plug 44 is then turned outward relieveing the compression of spring 49 until the atmospheric pressure in chamber 39 which enters through passage 41, overbalances and is sufficient to overcome the resistance of spring 49 and the pressure in chamber 38 which is connected to the engine side of valve 34 through passages 37 and 36. When this occurs, piston 28 will shift to the right in Figure 3 unseating valve 31, placing the upper part of segmental chamber 15 above the vane 57 in communication with bore 11 on the engine side of valve 34, through passages 23, 21 and 25, chambers 24 and 32 and passage 33, with the result that the engine intake pressure will be reflected above vane 57. Atmospheric pressure from passage 16 then becomes effective on vane 57 to rotate the vane clockwise in chamber 16 to the position shown in Figure 3, thereby closing throttling valve 34 in bore 11 and causing segment 56 to uncover port 13. When valve 34 closes, outward adjustment of member 44 is stopped, and member 44 is then turned slightly inward to increase the pressure of spring 49 sufficiently to shift piston 28 to the left in Figure 3 to seat valve 31 closing chamber 32. With this adjustment an engine intake vacuum slightly above the engine idling vacuum will necessarily cause unseating of valve 31 to establish communication between chambers 32 and 24. As soon as valve member 31 seats itself, communication between the engine manifold and chamber 15 is interrupted, and valve 34 will move to open position and segment 56 will cover port 13 under the influence of spring 54 as above pointed out.

With the device adjusted as described, so long as the engine intake pressures are equal to or below idling pressures, cylinder 28 will be positioned to the left in Figure 3, with valve member 31 seated on and closing communication between chamber 32 and 24, atmospheric pressure will exist on both sides of vane 57 in chamber 15, and spring 54 will hold valve 34 in wide open position, segment 56 will cover port 13, and operating extension 63 of stem 61 will be shifted to the extreme right position in Figure 1 out of the path of movement of throttle operating arm 64.

When the throttle 66 is closed suddenly to idling position, with the engine running at high speed, the engine intake pressures will drop substantially below the normal idling pressures with a resultant drop of pressure in chamber 38, which permits the atmospheric pressures in chamber 39 of cylinder 26 to shift piston 28 together with valve stem 29 to the right in Figure 3, unseating valve 31 and establishing communication between the engine intake manifold above valve 34, and the upper part of chamber 15. The atmospheric pressure below vane 57 then forces it upward with a snap to the position shown in Figure 3, closing valve 34 tightly, and uncovering the outer end of passage or port 13 and permitting air at atmospheric pressure from passage 43 to enter passage 11 through port 13, thereby establishing atmospheric pressure between the closed valve 34 and throttle valve 66 of the carburetor. As a result, the flow of air through the carburetor is completely cut off, even if substantial leakage occurs around valve 34 into the engine manifold. When valve 34 is closed, operating extension 63 of stem 61 will be positioned adjacent the upper end of arm 64 as shown in Figure 1, and as soon as arm 64 is actuated to open throttle valve 66 extension 63 is engaged by the upper part of arm 64, and valve 34 is forced toward open position, thereby assuring sufficient opening of valve 34 to supply a proper fuel mixture to the engine whenever throttle 66 is opened from idling position.

As soon as the pressures in the engine manifold reach the intake idling pressures, piston 28 will be shifted to seat the valve 31, cutting off chamber 15 from the engine intake manifold. Atmospheric pressures will then again build up on both sides of vane 57 in chamber 15 as above set forth, and spring 54 will become operative to shift valve 34 to full open position and to close port 13 until the engine intake vacuum again drops below the normal idling vacuum with the throttle 66 in idling position.

It will therefore be seen that an excellent low cost and easily installed fuel economizing and fume eliminating device is provided that may be easily installed on any conventional type of motor vehicle, without the necessity for tapping into the carburetor or engine intake manifold and by the operation of which both the flow of fuel and air into the engine is substantially completely cut off when the engine intake pressure is below normal idling pressure with the throttle in idling position, or when the engine is doing no useful work.

Modified forms of invention

In the form of invention so far described, a throttling control valve is utilized to cut off the fuel supply when the engine is doing no useful work, in addition to the usual throttle valve. In the following embodiments of the invention the added throttling valve is eliminated, devices are provided to modify the movement of existing throttles embodied in conventional types of carburetors for internal combustion engines. In such devices so long as the engine intake pressures do not fall below the normal idling pressures, the throttle control valve operates in usual manner, but when the intake manifold pressures drop below the normal idling pressures, when the accelerator is retracted, the throttle valve is closed completely to shut off the flow of fuel to the engine until the engine intake vacuum again reaches the normal idling vacuum or the accelerator is actuated to open the throttle valve.

In the form of invention shown in Figure 5, 81 indicates the outlet section of a conventional type of carburetor provided with a flange 82 having holes 83 by which the carburetor is connected to the flange of the engine intake manifold in well known manner. Formed in section 81 is the idling fuel jet passage 84, the outer end of which is closed by removable screw plug 85. A throttle valve 86 is centrally mounted on and pivotally supported by shaft 87 operated by the usual accelerator control (not shown). Throttle valve 86 is provided with enlarged section 88 adapted when the throttle is in fully closed position to seal the outlet of idling jet 84 so that no fuel can be drawn either from the main or the idling jets through passage 89 by the engine suction.

Formed integrally with section 81 is a tubular or cylindrical extension 90 provided with a passage 91 for the ingress of atmosphere and threaded at its open end to receive the threaded section of closure plug or cap 93. Plug 93 has an annular chamber 94 formed therein. Communication is established between chamber 94 and the intake manifold of the engine through pipe connection or tube 95 tapped into plug 93 and the manifold on the engine side of the throttle.

Secured to plug 93 is a resilient metallic bellows 96, to the end wall 97 of which throttle stop pin 98 is rigidly secured. Stop pin 98 extends through a suitable hole formed in the housing 1 communicating with bore 89. In the extended position of bellows 96, pin 98 forces throttle valve 86 to the dotted line position at which proper idling of the engine is permitted, while in contracted position of bellows 96 illustrated, the pin 98 is brought to the position illustrated by solid lines permitting the throttle valve 86 to close tube 89, and the idling jet 84 completely, the usual external idling stop and stop pin used on conventional carburetors being eliminated.

Surrounding a section of pin 98 which extends into the interior of bellows 96 is one end of a compression spring 99, the other end of which surrounds an extension 101 of adjusting screw 102. Screw 102 is threaded into a suitably tapped inwardly extending boss 103 of plug 93, and is adjustably locked in position by means of locknut 104.

In operation of this form of mechanism, screw 102 is adjusted so that when the engine intake pressure is equal to or higher than the idling pressure, bellows 96 is fully extended to the position indicated by dotted lines, and stop pin 98 projects into bore 89 to stop throttle valve 86 in idling position, and uncovering the end of idling jet 84 to permit a proper idling fuel supply to flow to the engine.

Whenever the engine intake vacuum pressure drops below normal idling pressure the pressure in the interior of bellows 96 is lowered to the point where the excess of pressure surrounding the bellows in the interior of tubular extension 90 will cause the bellows to contract to the full line position illustrated. Pin 98 will then be fully withdrawn from passage 89 permitting the throttle valve 86 to close completely, thereby covering the outlet of idling jet 84 in the bore 89, and substantially completely cutting off all flow of fuel mixture to the engine, until the vacuum in the manifold rises to the normal idling vacuum or until valve 86 is opened by operation of the accelerator. When the engine intake pressure reaches the engine idling pressure bellows 96 will again fully expand projecting the end of stop pin 98 into passage 89 to act as the idling stop for valve 86.

In this form of the invention it will be seen that shaft 87 may be actuated freely from the fully closed position by rotation of shaft 87, regardless of the pressures existing in the engine intake manifold so that the engine is always assured of a proper fuel supply whenever the throttle is open. This form of invention it will be noted is designed primarily to be built into a carburetor.

In the form of invention shown in Figure 6, the construction of the embodiment of the invention in Figure 5 is modified to permit ready attachment to existing carburetors. Like reference characters have been applied to like parts, and for an understanding of the parts not hereinafter specifically described, reference may be had to the description of similar parts given in connection with Figure 5. This form of the invention differs from that illustrated in Figure 5, by making the tubular member 90, together with bellows 96 and the parts carried thereby as a unit separate from housing 81, and providing it with suitable attaching clamps (not shown) to be fastened to the carburetor body. Any well known construction may be used to clamp the member 90 to the exterior of carburetor section 81 in such position that stop 98 will be positioned externally of the carburetor outlet opening and so located as to be engaged by the end of adjustable carburetor stop screw 106 threaded into extension 107 of carburetor operating arm 108 and locked in adjusted position by means of locking screw 109 in well known manner. Arm 108 is provided with a split upper end adjustably clamped to the outwardly extending end of shaft 87 by means of clamping screw 111.

Arm 108 is actuated by the usual accelerator control of the engine (not shown). In operation of this form of invention when the engine intake pressures are equal to or higher than the normal idling pressures, the parts assume the position illustrated by full lines, and with the accelerator in retracted position, throttle 86 will assume idling position leaving the jet 84 uncovered and a sufficient throttle opening to supply the necessary air for engine idling purposes. When however the engine intake pressures drop below the normal idling pressures, bellows 96 will contract to the position illustrated in dotted lines withdrawing stop 98 sufficiently so that when the accelerator is retracted, it will force throttle valve 86 to fully closed position illustrated by the dotted lines, cutting off the flow of fuel and air into the engine completely for all practical purposes. In this form of invention, it will also be noted as soon as arm 108 is actuated by the accelerator mechanism, throttle valve 86 will be opened regardless of the pressure existing in the intake manifold of the engine thereby assuring a proper supply of fuel to the engine for all throttle conditions.

In the form of invention illustrated in Figures 7 and 8, parts used similar to those used in Figures 5 and 6 are designated by like reference characters and for a full understanding of these parts refernce may be had to the description given thereof in connection with Figures 5 and 6.

In this form of invention, the metallic bellows and manifold connection utilized in the form of invention shown in Figures 5 and 6 is eliminated, and shaft 87 is journalled in housing 81 substantially to one side of the center of throttle valve 86 and passage 89, so that substantial pressures tending to rotate throttle valve 86 and shaft 87 in a clockwise direction in Figure 7 to the closed position shown in dotted lines are developed in operation by the flow through passage 89 into engine intake manifold.

As illustrated more clearly in Figure 8, in this form of invention a stop arm 112 is secured by means of pin 113 to shaft 87, between the operating arm 108 and the carburetor body 81. Threaded into a sluitably tapped hole formed in the end of arm 112 is externally threaded cylindrical member 114, which is adjustably locked in position on the stop arm by means of a locknut 115. The bore of cylindrical member 114 is internally threaded at its end and receives spring tension adjusting screw plug 116 provided with a central guide 117 in which the end of pin 118 is slidably guided. Pin 118 is formed integrally with shoulder 119 of a stop pin 120. Pin 120 is forced yieldably outward by means of a compression spring 121, interposed between plug 116 and shoulder 119. Stop pin 120 is adapted to engage stop pin 122 fastened to the body of the carburetor in such position that with pin 120 fully extended and the accelerating mechanism retracted, throttle valve 86 is permitted to assume the idling position shown in full lines in Figure 7. The tension of spring 121 is so adjusted that when the idling intake vacuum drops below the normal idling vacuum the unbalanced forces tending to close throttle valve 88 become sufficient to compress spring 121, and when the accelerator mechanism is retracted, spring 121 will yield sufficiently to permit valve 86 to assume the position shown in dotted line, thereby substantially completely cutting off the flow of air and fuel to the engine until throttle valve 86 is opened by actuation of arm 108 by the accelerator mechanism, or the engine intake vacuum increases to idling vacuum permitting spring 121 to expand and to restore throttle 86 to idling position.

In this form of the invention it will also be noted that a proper fuel supply is assured for all positions of throttle opening and the fuel supply cannot be cut off until the accelerator mechanism reaches idling position regardless of the intake manifold pressures that may develop.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination with the carburetor and throttle of an internal combustion engine; a fuel supply cut-off valve adapted for installation adjacent to and on the engine side of said throttle valve; and completely automatic means operative only when the throttle is in idling position and the pressures on the engine side of the throttle drop below the pressures normally present when the engine is idling to actuate said valve to cut off the fuel supply to the engine, said means including a device for admitting air directly from the atmosphere into the space between said cut-off and throttle valves.

2. A fuel control device adapted for insertion in the passageway between the carburetor and intake manifold of an internal combustion engine having a throttle valve in said passageway, said device embodying a valve for controlling the flow of fuel supply from the carburetor to the engine; and completely automatic means responsive to pressures on the engine side of the throttle lower than normal idling intake manifold pressures of the engine when the throttle is in idling position to actuate said valve to cut off the fuel supply, said means including a device for admitting air directly from the atmosphere into the space between said cut-off and throttle valves.

3. In combination with the carburetor and throttle of an internal combustion engine, a fuel supply cut-off valve disposed in the engine intake connection on the engine side of the throttle; and completely automatic means operative when the pressures on the engine side of the throttle drop below the pressures normally present when the engine is idling to completely close said valve and to admit atmospheric pressure between said throttle and said valve.

4. For use in combination with the intake conduit of a combustion engine, a fuel economizing and smoke eliminating mechanism comprising a fuel control valve designed for insertion in the intake conduit, and a pressure responsive device for actuating said control valve; said device comprising a small fluid motor closely adjacent and connected to said valve; a fluid line connected to said motor and pilot mechanism for controlling said motor; said pilot mechanism comprising a needle valve designed to open and close said fluid line, and a pressure responsive control element connected to said needle valve.

5. In combination with an internal combustion engine having a fuel intake conduit, and throttle valve therein, a normally closed auxiliary valve assembly designed to open for the admission of a non-combustible fluid to said intake conduit at a point above the throttle valve whenever the latter is closed and the engine vacuum has gone below normal idling vacuum; said auxiliary valve assembly comprising a housing having a curved inner surface portion and a passageway intersecting said surface portion to form a port for said non-combustible fluid, and a curved valve element rotatably mounted within said housing for controlling said port; and automatic means for shifting said valve element in response to variations in the pressure differential between the engine vacuum and the atmosphere.

6. In combination with an internal combustion engine having a fuel intake conduit and a throttle valve therein, a normally closed auxiliary valve assembly designed to open for the admission of a non-combustible fluid to said intake conduit at a point above the throttle valve whenever the latter is closed and the engine vacuum has gone below normal idling vacuum; said auxiliary valve assembly comprising a housing having an internal chamber and a passageway for the non-combustible fluid intersecting said chamber to form a port, a valve mounted within said housing and having an operating surface for controlling communication between said port and said chamber, a pressure responsive device connected to said valve, a pilot valve mechanism controlling said device, and means for subjecting said pilot valve mechanism to the pressures existing in the intake conduit.

7. In combination with an internal combustion engine having a fuel intake conduit under throttle valve control, an oscillatible shaft extending across said conduit; a degassing valve disposed within said conduit and secured to said shaft for oscillation therewith; means forming a passageway for the admission of non-combustible fluid to said conduit at a point between the throttle and degassing valves; an auxiliary valve secured to one end of said shaft and controlling said passageway; and a pressure responsive mechanism for closing the degassing valve and opening the auxiliary valve when the engine suction reaches a predetermined value under closed throttle.

8. A compact fuel economizer and smoke eliminating device designed for attachment to the carburetor and intake manifold of an internal combustion engine, said device comprising a body having a bore adapted for conveying fuel and an extension providing an internal chamber closely adjacent said bore, the axis of said chamber being substantially normal to the axis of said bore; an oscillatible shaft disposed axially of said chamber and projecting into said bore; a degassing valve disposed within said bore and secured to said shaft; said chamber having a connection with said bore and a connection adapted to receive non-combustible fluid; and an auxiliary valve fitted within said chamber, secured to said shaft, and having a surface designed to control the flow of non-combustible fluid to said connection.

9. A fuel control device comprising means adapted for association with a carburetor and throttle of an internal combustion engine embodying a butterfly cut-off valve interposed between the engine intake manifold and the throttle; means responsive to pressures on the engine side of the throttle lower than normal idling intake manifold pressures of the engine to actuate said valve to cut off the engine intake manifold from the carburetor; and means for admitting atmospheric pressure between said valve and said throttle when said valve is closed.

WILLIAM E. LEIBING.
WILLIAM B. FAGEOL.